United States Patent
Klement

(10) Patent No.: US 7,262,895 B2
(45) Date of Patent: Aug. 28, 2007

(54) DETERMINING OPERATING POINT OF FEEDBACK CONTROLLER APPLIED TO OPERATION OF OSCILLATING SCANNING DEVICE

(75) Inventor: Martin Christopher Klement, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 113 days.

(21) Appl. No.: 11/152,329

(22) Filed: Jun. 14, 2005

(65) Prior Publication Data

US 2006/0279364 A1  Dec. 14, 2006

(51) Int. Cl.
  *G02B 26/08* (2006.01)
(52) U.S. Cl. .................. 359/213; 359/197; 359/199
(58) Field of Classification Search ............... 347/247, 347/237; 359/197, 199, 213
  See application file for complete search history.

(56) References Cited

U.S. PATENT DOCUMENTS

| | | | |
|---|---|---|---|
| 5,294,945 A * | 3/1994 | Omura et al. ............... | 347/247 |
| 5,543,956 A | 8/1996 | Nakagawa et al. | |
| 5,606,447 A | 2/1997 | Asada et al. | |
| 5,629,790 A | 5/1997 | Neukermans et al. | |
| 5,692,023 A * | 11/1997 | Clark ......................... | 375/376 |
| 5,767,666 A | 6/1998 | Asada et al. | |
| 5,959,760 A | 9/1999 | Yamada et al. | |
| 6,069,727 A | 5/2000 | Cho et al. | |
| 6,075,639 A | 6/2000 | Kino et al. | |
| 6,122,090 A | 9/2000 | Kino et al. | |
| 6,388,689 B1 * | 5/2002 | Toda et al. ................. | 347/132 |
| 6,794,794 B2 | 9/2004 | Klement | |
| 6,803,938 B2 * | 10/2004 | Turner ........................ | 347/237 |
| 6,812,669 B2 | 11/2004 | Hagen | |
| 6,838,661 B2 | 1/2005 | Klement | |
| 6,844,951 B2 | 1/2005 | Cannon et al. | |

\* cited by examiner

*Primary Examiner*—Benny Lee
*Assistant Examiner*—Levi Gannon
(74) *Attorney, Agent, or Firm*—Luedeka, Neely & Graham, P.C.

(57) ABSTRACT

A method for determining an operating point of an oscillation controller. The method builds a model of an oscillation device based upon its design parameters. Then the resonant frequency of each specific oscillator is measured in its application environment, and the model, or a table derived from the model is used to define the operating point. The operating point may be expressed in terms of clock counts by factoring in the clock rate of the oscillation controller.

20 Claims, 3 Drawing Sheets

DETERMINING OPERATING POINT OF FEEDBACK CONTROLLER APPLIED TO OPERATION OF OSCILLATING SCANNING DEVICE

FIELD

This invention relates to the field of oscillating mechanisms. More particularly, this invention relates to torsional oscillators used in scanners, printers, and similar system.

BACKGROUND

Electro-mechanical oscillators are used to drive electro-optical mechanisms such as printers, scanners, barcode readers and similar devices. A torsion oscillator, which is one type of oscillation device, typically includes a mirror that is disposed on a plate that is cut or etched from a silicon wafer and supported on trunnions. In one embodiment, magnets are attached to the plate and when electric current passes through a nearby coil, a force is exerted on the magnets which is translated to the plate. This force causes oscillation of the plate which twists the trunnions. Other forces may be employed to make such a system oscillate, such as electric fields or mechanical forces. The plate is excited to oscillate, preferably at or near a resonant frequency, by an oscillation controller that causes alternating current to pass through the coil at or near the resonate frequency or at or near a harmonic of the resonant frequency. The angle of the mirror moves sinusoidally with respect to time at a certain amount of sweep (termed amplitude), at a certain repetition rate (termed frequency), and with a potential lack of symmetry (termed median offset). Unfortunately, the characteristics of mirrors can vary significantly due to physical variations from manufacturing tolerances, and changing environmental conditions, particularly temperature changes, that typically affect the resonant frequency. Consequently, the amplitude, frequency and median offset of an oscillator must be stabilized for useful operation. What is needed is an effective method for controlling scan time intervals in these systems.

SUMMARY

In the present invention a method is provided for determining a desired operating condition of an optical scanning oscillation device. The method begins by providing a mathematical model that relates oscillation frequencies to time intervals of the oscillation device, where each oscillation frequency has an oscillation period and each individual time interval is less than its related oscillation period and corresponds to the time required for the oscillation device to move from a first scan angle position to a second scan angle position when the oscillation device is operating at the oscillation frequency that is related to the individual time interval. The method continues with determining a drive frequency for a specific optical scanning oscillator. Then the mathematical model and the drive frequency for the specific optical scanning oscillator are used to determine a target time interval for the specific optical scanning oscillator. The target time interval corresponds to a desired time interval for the specific optical scanning oscillator to move from the first scan angle position to the second scan angle position.

An alternate embodiment provides a method for determining a desired operating condition of an optical scanning oscillation device. This method begins by providing a mathematical formula that relates a time interval to an oscillation frequency of the oscillation device. Next, the mathematical formula is used to calculate a look-up table of time intervals for different oscillation frequencies of the oscillation device. Then, a drive frequency for a specific oscillator is determined and then the drive frequency of the specific oscillator and the look-up table of time intervals are used to determine a target time interval for the specific oscillator.

A method is also provided for controlling a light beam. The method includes reflecting the light beam off an oscillation device whereby the light beam is directed in a scanning motion to an imaging surface. The method includes detecting the light beam with at least two sensors positioned to detect the light beam at specific positions in the scanning motion. The method also involves providing a mathematical model that relates a time interval to an oscillation frequency of the oscillation device, where the time interval corresponds to a specific time interval for the oscillation device to scan the light beam between the at least two sensors. The method continues with determining a drive frequency of a specific oscillator and then using the mathematical model and the drive frequency of the specific oscillator to calculate a target time interval for the specific oscillator, where the target time interval corresponds to a desired time interval for the specific oscillation device to scan the light beam from one sensor to another sensor.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
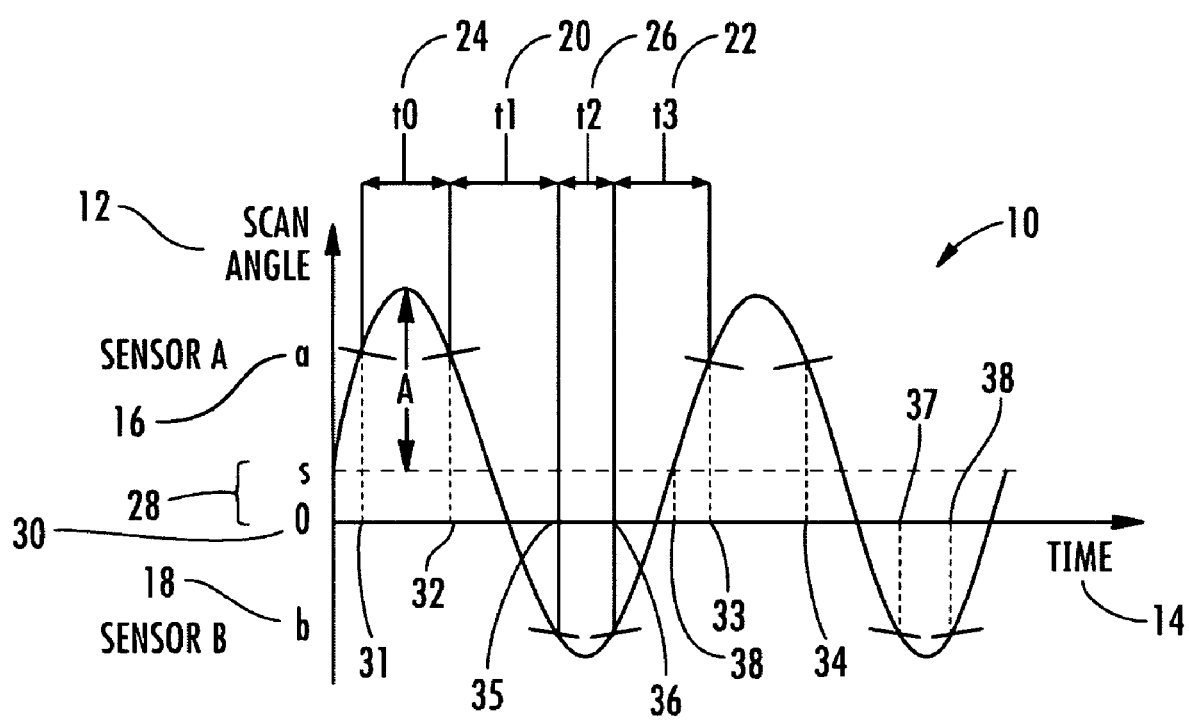
FIG. 1 is a scan graph of an oscillator motion, according to the invention.

In many scanners and printers used with computers, data terminals, digital imaging systems, and similar devices, a light beam (preferably a laser beam) is reflected off a torsion oscillator mirror to sweep a target. In very general terms, torsion oscillator construction is such that its motion is controlled by the characteristics of the electrical drive power supplied to it. FIG. 1 shows a stylized scan graph 10 of the typical output scan angle 12 of a light beam reflected off a torsion oscillator mirror surface in an oscillation device design as the scan angle varies over time 14, here without any optical correction, at an image surface (such as a photoconductor in a printer). Sensors positioned at the scan angle location of Sensor A (angle 16) and the scan angle location of Sensor B (angle 18) (or optically equivalent sensor locations) may be used to determine the time intervals, t0, t1, t2, and t3 shown in FIG. 1 as intervals 24, 20, 26, and 22 respectively. Preferably the system employing a torsion oscillator includes mechanisms and controls that cause use of reflected laser light in the region of t1 (interval 20) and/or t3 (interval 22), which are the more linear regions of the scan.

Time interval t1 corresponds to a forward linear segment interval 20 and time interval t3 corresponds to a reverse linear segment interval 22 of a bi-directional scanning device. Only one of these segments is used for scan functions in a mono-direction scanning device. FIG. 1 illustrates a median offset 28 indicating asymmetry of the oscillation relative to the zero scan angle 30, which typically represents the resting position of the oscillator. Time ticks 31, 32, 33, and 34 represent specific time instances where the light beam is detected by Sensor A or Sensor B.

Each specific oscillator installed in scanning system, such as a laser imaging system within a particular laser printer, has a unique resonant frequency, $f_r$, at a given environmental condition. In a preferred embodiment, the nominal $f_r$ is 3200 Hz and the expected variation in $f_r$ (depending on environmental conditions) is ±100 Hz. Thus for the preferred embodiment the expected range of resonant frequency values is 3100 Hz≤$f_r$≤3300 Hz. In a laser printer application, a laser beam is directed to the axis of rotation of the torsion oscillator where it is reflected off of a mirrored surface of the torsion oscillation device. A mechanical angle of rotation of ±23° is preferred. This angle of rotation is equivalent to a ±46° scan angle swept by the laser beam reflected off of the torsion oscillator mirrored surface. The techniques disclosed herein are equally valid if the torsion oscillator model is expressed in terms of mechanical angle or scan angle. The relationship between the two is a factor of 2 multiplier that results from the optical properties of light beam angles of incidence and reflection to and from a mirror. The scan angle will be used herein for these calculations.

Two variables define the scanning motion of FIG. 1: (1) the maximum scan angle (shown as "A"), and (2) the frequency of oscillation (calculated as the reciprocal of the period 38 of one cycle). Most preferably the torsion oscillator is driven by its controller at a frequency that is sufficiently close to its natural resonance frequency to substantially minimize the power needed to drive the device. Once the controller establishes a drive frequency substantially at the resonant frequency, it is preferable to maintain that resonant drive frequency during an entire subsequent operational period. During that operational period various environmental parameters (particularly ambient temperature) may change, and these changes affect the natural resonance frequency. Consequently, the controller may end up driving significantly off resonance, even though the control system initially started as close as reasonably possible to resonance. As a result the driving frequency is almost never exactly at the true resonant frequency of the scanning device. However, an operational period may be rather short, such as the time to print single page, after which the controller may be reset to the then-current resonant frequency. Also in some embodiments there may not be a need or desire to minimize power consumption, so the frequency of the driving signal (the drive frequency) provided by the controller to the oscillator may not correspond at all to its resonant frequency.

It is very important for the printer to maintain constant scan time intervals during an operational period. In bi-directional scanning devices both intervals 20 and 22 in FIG. 1 should be held constant (although not necessarily equal). In mono-direction scanning devices only the active scan time interval (interval 20 or interval 22) should be held constant. Theoretically (within certain bounds), the intervals 20 and/or 22 could be held constant over any change in resonant driving frequency by adjusting the maximum amplitude of the scan angle as the resonant frequency changes. However, it is generally preferred to maintain a constant maximum scan angle regardless of driving frequency. Maintaining a constant maximum scan angle causes the scan intervals (e.g., scanning interval t1 (interval 20) and scanning interval t3 (interval 22) to change depending upon the driving frequency. However, when the driving frequency is held constant during an operational period, scanning intervals t1 (interval 20) and t3 (interval 22) may be held constant during that operational period by driving those intervals to target times that are consistent with a constant maximum scan angle (e.g. "A" in FIG. 1), regardless of the driving frequency.

Figure 2:
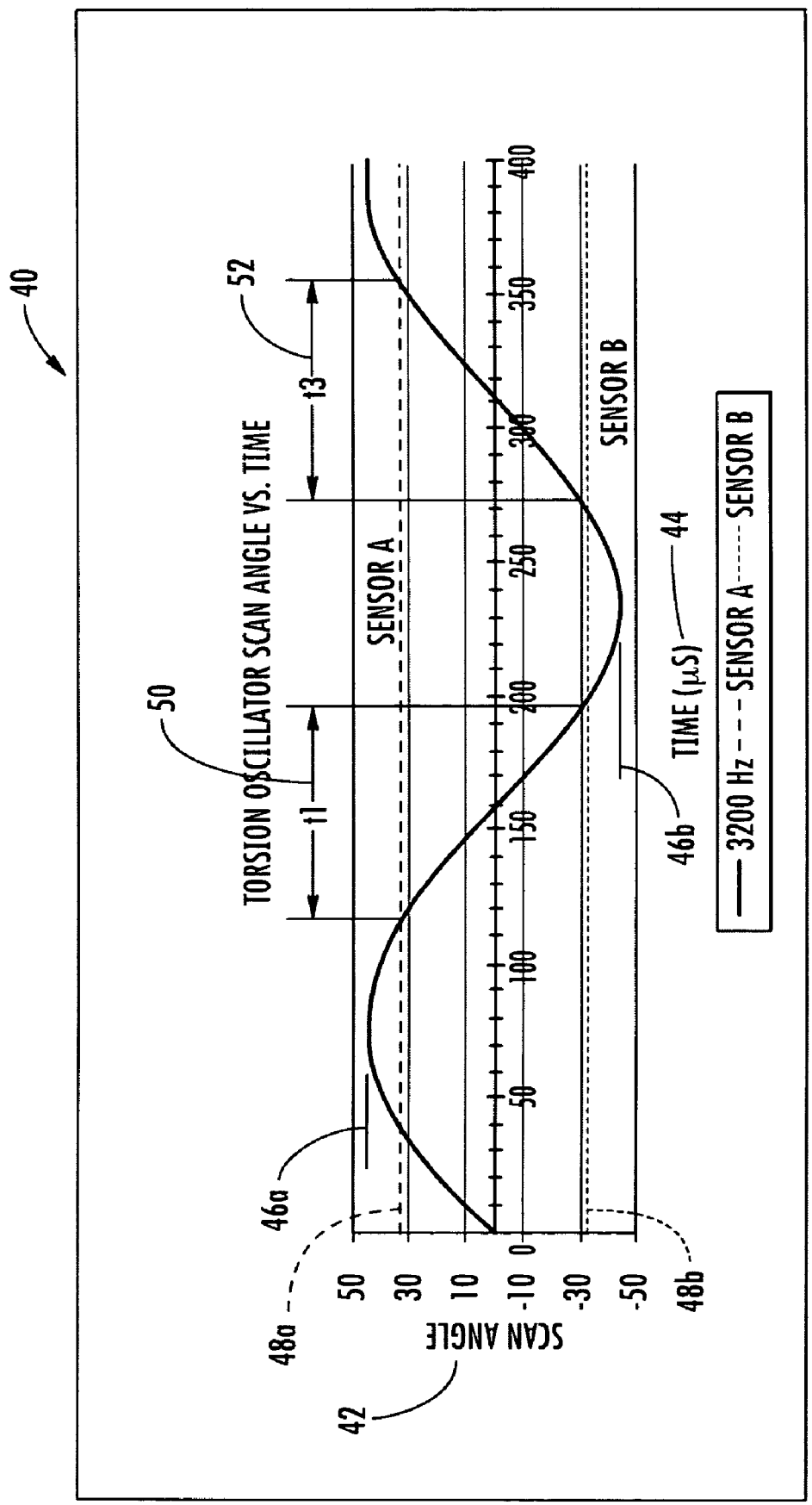
FIG. 2 is a scan graph of an alternate oscillator motion.

FIG. 2 shows a typical sinusoidal scan angle vs. time response curve for a preferred embodiment torsion oscillator oscillating at the nominal 3200 Hz with a mechanical angle of rotation of ±23° which is equivalent to the ±46° maximum scan angles 46a/46b as shown in FIG. 2. In a preferred embodiment printer application, the optical system is designed for the Sensor A (angle 16) and Sensor B (angle 18) to be located at ±32.66° of scan angle shown in FIG. 1, which is equivalent to Sensor A scan angle 48a and Sensor B scan angle 48b as is shown by the dotted lines in FIG. 2. Again referring to FIG. 2, the available regions of the scan angle for sweeping an image onto the photoconductor in a laser printer occur over the time range, t1 (forward linear segment interval 20) and/or t3 (reverse linear segment interval 22) (if bi-directional scanning is implemented).

In the most preferred embodiments the objective of torsion oscillator controller is to establish and maintain a desired maximum scan angle amplitude (optimally ±46°), given the constraint of maintaining a specified driving frequency of the oscillator during an operational period of the system. By knowing the scan angle location of the sensors, the desired constant maximum scan angle amplitude may be achieved by maintaining a specific target time interval between sensor detections, with the target time interval value being calculated by methods presented hereinafter. The specific time interval is maintained in the scanning system by measuring the difference between the target and actual time intervals between sensor detections and using the difference as a feedback measure to adjust the drive level of the oscillator controller.

The torsion oscillator motion is expressed as a pure sinusoidal wave in scan graph 40 of FIG. 2. This sinusoidal form is a valid formula for the most preferred embodiment. However, the technique disclosed herein is also applicable to alternate torsion oscillator embodiments which have non-sinusoidal motion, as long as a formula or model can be developed to accurately approximate the typical torsion oscillator motion. FIG. 2 illustrates a scan angle 42 plotted over time 44. In the case of the most preferred embodiment where sinusoidal motion exists as shown in FIG. 2, the time range t1 (forward linear segment 50) will be equal to the time range t3 (reverse linear segment 52) as long as Sensor A scan angle 48a and Sensor B scan angle 48b are located equally about 0 as shown in FIG. 2. If the torsion oscillator motion is not sinusoidal or the sensors are not placed symmetrically about 0, then t1 and t3 have to be calculated separately. For the preferred embodiment shown in FIG. 2, t3 is the simplest to calculate using the following equation, EQN. 1:

$$t3 = [1/(2 * \pi * f_r)] * \{\sin^{-1}([Y_a - O]/A)\} - \sin^{-1}([Y_b - O]/A)\}$$

where,

A=amplitude of torsion oscillator maximum scan angle 46a, which is 46° for the preferred embodiment O=median offset of the sinusoidal response from 0° scan angle, where 0° is assumed for the initial control target.

$Y_a$=magnitude of the scan angle where it crosses sensor A, Sensor A angle 48a.

$Y_b$=magnitude of the scan angle where it crosses sensor B, Sensor B angle 48b.

Using the formula represented in EQN. 1, Table 1 is generated for the expected range of resonant frequencies of a typical oscillation device, here having an $f_r$ in the range 3100 Hz$\leq f_r \leq$3300 Hz. The print interval, t3=t1, column in Table 1 is calculated using EQN. 1 with the following values assumed:
A=46°
O=0°
$Y_a$=32.66°
$Y_b$=−32.66°

TABLE 1

Timer Counts vs. Resonant Frequency

|  |  | Frequency (Hz) | Print Interval, t3 = t1 (μsec) | Timer Counts |
|---|---|---|---|---|
|  | 0 | 3100.00 | 81.066 | 9727 |
|  | 1 | 3110.00 | 80.805 | 9696 |
|  | 2 | 3120.00 | 80.547 | 9665 |
|  | 3 | 3130.00 | 80.289 | 9634 |
|  | 4 | 3140.00 | 80.033 | 9604 |
|  | 5 | 3150.00 | 79.779 | 9573 |
|  | 6 | 3160.00 | 79.527 | 9543 |
|  | 7 | 3170.00 | 79.276 | 9513 |
|  | 8 | 3180.00 | 79.027 | 9483 |
|  | 9 | 3190.00 | 78.779 | 9453 |
| Nominal | 10 | 3200.00 | 78.533 | 9423 |
|  | 11 | 3210.00 | 78.288 | 9394 |
|  | 12 | 3220.00 | 78.045 | 9365 |
|  | 13 | 3230.00 | 77.803 | 9336 |
|  | 14 | 3240.00 | 77.563 | 9307 |
|  | 15 | 3250.00 | 77.325 | 9278 |
|  | 16 | 3260.00 | 77.087 | 9250 |
|  | 17 | 3270.00 | 76.852 | 9222 |
|  | 18 | 3280.00 | 76.617 | 9194 |
|  | 19 | 3290.00 | 76.385 | 9166 |
|  | 20 | 3300.00 | 76.153 | 9138 |
|  |  | In Printer ^ |  | In Printer ^ |

This print interval column in Table 1 is preferably calculated for the model once using design parameters of the oscillation device (here a printer) and the print interval column used to calculate the timer counts which will be stored along with the corresponding resonant frequency in a look-up table stored within each printer's memory. The columns which are stored within the printer memory are shown in Table 1 with the symbol "In Printer ^" below the appropriate column.

The Timer Counts are calculated with the following equation, EQN. 1:

Timer Counts=Integer part of [{Print Interval}*$f_{clk}$]

where $f_{clk}$=120 MHz and the Print Interval is in μS for dimensional consistency.

The printer microprocessor/ASIC controller generates a counter clock signal $f_{clk}$, and the target value of the Timer Counts for a particular resonant frequency, $f_r$, which it detects for that particular printer at that particular set-up time. A 10 Hz. increment is used in the preferred embodiment example of Table 1, but any increment could be chosen. The trade-off is resolution in the look-up table stored in the printer vs. the amount of memory required to store the table. Another alternative is to include EQN. 1 in the printer firmware and calculate the value for each frequency determined. This is a more costly solution than is required. Thus a look-up table is used in the preferred embodiment.

Regardless of what size table is stored in the printer, it is likely that the measured resonant frequency, meas.$f_r$, will not match an exact frequency used to generate Table 1. Therefore, a linear interpolation technique is used within the printer controller to calculate the desired target value for the Timer Counts for that set-up, according the following, EQN. 3:

{Timer Counts}$_{target}$=([{meas.$f_r$}−{f below}]/
[Δfreq.])*([count @f above ]−[count @f 
below])+[count @f below] where {f below} is the nearest frequency in Table 1 less than, or below, the measured frequency, {meas.fr}

[Δfreq.] is the frequency increment used in Table 1 (10 Hz in this example)

[count @f above] is the Timer Count from Table 1 which corresponds to the nearest frequency in Table 1 which is greater than, or above, the measured frequency, {meas.$f_r$}, and

[count @f below]) is the Timer Count from Table 1 which corresponds to the nearest frequency in Table 1 which is less than, or below, the measured frequency, {meas.$f_r$}.

Published U.S. Patent Application 20040120023 describes how to sweep frequencies to measure the torsion oscillator resonant frequency, $f_r$. Using that technique or an equivalent method, if the resonant frequency is determined to be:

{meas.$f_r$}=3234.568 Hz the nearest frequency below this measured frequency, {fbelow} from Table 1, is:

{f below}=3230 Hz and the corresponding counts from Table 1 are:

[count @f above]=9307
[count @f below])=9336

Then, from EQN. 3, the Timer Count target is:

{Timer Counts}target=([3234.568−3230]/10)*(9307−
9336)+9336=9323

In this calculation the count is rounded to the nearest integer count. Note that in some applications it is not necessary to calculate a Timer Count target; instead, calculation of a target time interval such as a target scan time (e.g., print interval t3=t1 in Table 1) may provide sufficient definition of a operating point of an oscillation controller.

As a comparison, if the equation (EQN. 1) is used to calculate the Timer Count target value for the measured resonant frequency of 3234.568 Hz, a time interval of 77.695 μS is calculated. Using that value in EQN. 2 results in exactly the same Timer Count target value of 9323. Using the look-up table resulted in no difference in the Timer Count target value.

The Timer Count target value may, for example, be used by an oscillation controller to instruct a drive signal generator to alter the frequency of the drive signal such that the oscillator operates at or near its resonant frequency. For example, a proportional plus integral (PI) oscillation controller within a microprocessor/ASIC controller may initially drive the measured t1 value, as represented by counts of the counter clock, $f_{clk}$, to match the t1$_{target}$ value as represented by the {Timer Counts}target value calculated by EQN. 3 above. Once this is achieved, a frequency offset is determined and then a proportional plus integral controller is used to maintain the frequency offset at this measured value. This control technique is described in U.S. Pat. No. 6,838, 661. Frequency offset is the frequency difference between an operating frequency and a resonant frequency.

EXAMPLE

Figure 3:
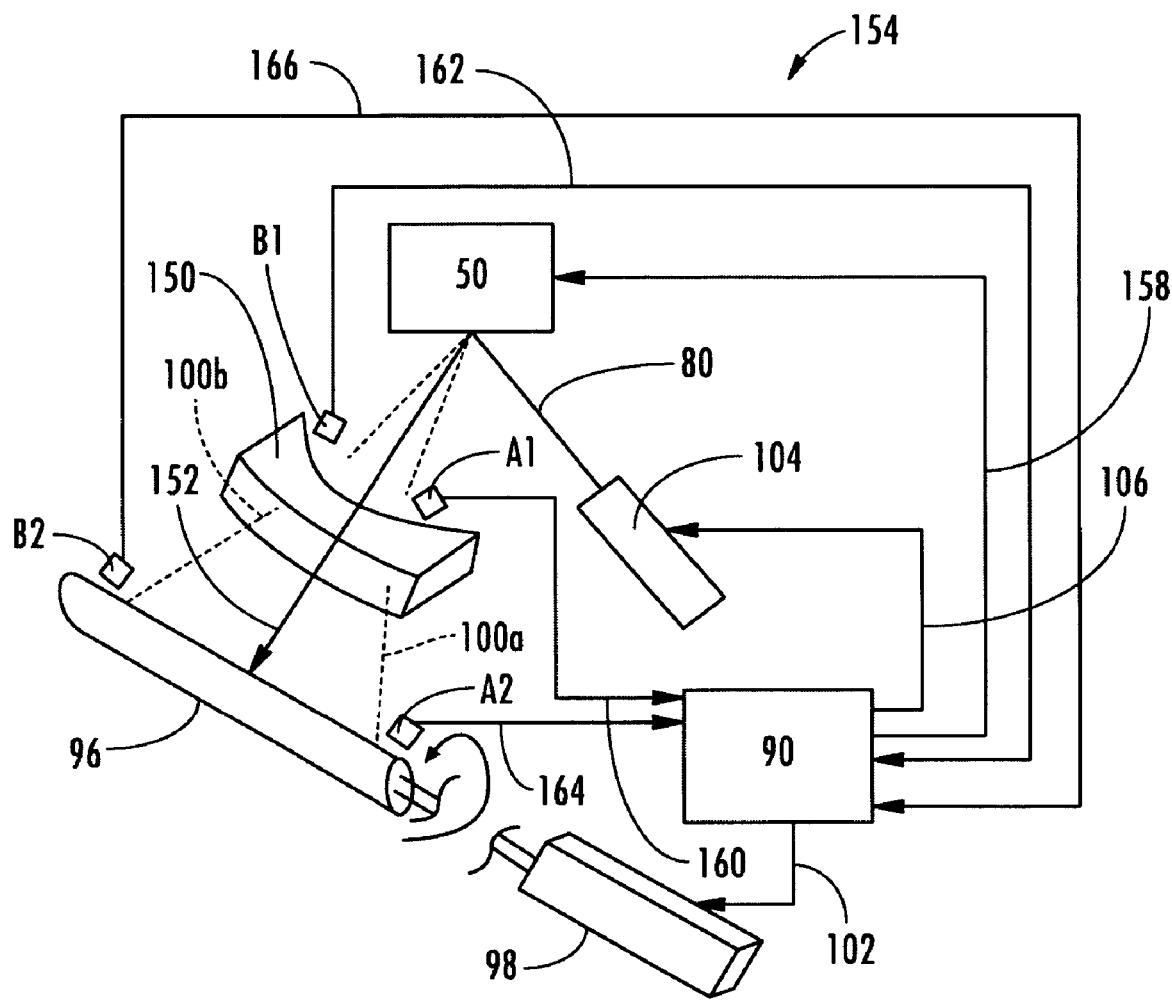
FIG. 3 is a schematic view of a printer imaging system.

A laser printer is an example of a system benefiting from a determination of a desired operating condition of its oscillation device. FIG. 3 depicts a schematic of such a device, printer imaging system 154. A photoconductor, illustrated as drum 96, rotated by drive train 98 receives light from the reflected light beam 152 through a lens 150 when the reflected light beam 152 is within the imaging window during its sweep. The outer boundaries of the imaging window are illustrated by broken lines 100a and 100b. Drive train 98 is controlled by control logic 90 along path 102 to adjust the rate of rotation of drum 96. Similarly, control logic 90 sends drive information to the laser 104 along path 106 to modulate the laser 104.

Path 158 between control logic 90 and torsion oscillator 50 controls the oscillation of torsion oscillator 50. Path 158 in FIG. 3 is simplified for clarity of illustration. Path 158 may include elements such as a frequency generator, an amplitude adjustment system, an offset adjustment system, or a power drive system.

In FIG. 3, paths 160 and 162 connect sensors A1 and B1 respectively to control logic 90. Sensor A2 sends a light detect signal along path 164 to control logic 90 while sensor B2 utilizes path 166 to transmit a signal to control logic 90.

In accordance with a preferred embodiment, the rotation speed of the photoconductor drum 96 is adjusted on drive train 98 by control logic 90 to provide a desired resolution in the process direction (the process direction being the direction perpendicular to the sweep direction). Similarly, the modulation period of laser 104 is adjusted by control logic 90 to provide a desired beam sweep.

The foregoing description of preferred embodiments for this invention has been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for determining a desired operating condition of an optical scanning oscillation device, the method comprising:
   (a) providing a mathematical model that relates oscillation frequencies to time intervals of the oscillation device, each oscillation frequency having an oscillation period and each individual time interval being less than its related oscillation period and corresponding to the time required for the oscillation device to move from a first scan angle position to a second scan angle position when the oscillation device is operating at the oscillation frequency that is related to the individual time interval;
   (b) establishing a drive frequency for a specific optical scanning oscillator; and
   (c) using the mathematical model and the drive frequency for the specific optical scanning oscillator to determine a target time interval for the specific optical scanning oscillator, the target time interval corresponding to a desired time interval for the specific optical scanning oscillator to move from the first scan angle position to the second scan angle position.

2. The method of claim 1 wherein step (a) comprises providing a sinusoidal mathematical model that relates oscillation frequencies to time intervals of the oscillation device.

3. The method of claim 1 wherein step (a) further comprises providing a mathematical model incorporating a median offset parameter for the oscillation device.

4. The method of claim 1 wherein step (c) comprises using the mathematical model and the drive frequency of the specific oscillator to calculate a target forward time interval and to calculate a target reverse time interval for the specific oscillator.

5. The method of claim 1 wherein the oscillation device has a clock frequency, and the method further comprises:
   (d) using the target time interval and the oscillation device clock frequency to calculate a timer count for the oscillation device.

6. The method of claim 1 wherein the time intervals in the mathematical model that relate to oscillation frequencies of the oscillation device are a function of a constant maximum optical scan angle of the oscillation device.

7. The method of claim 1 wherein the first scan angle position is a first sensor optical scan angle and the second scan angle position is a second sensor optical scan angle.

8. The method of claim 1 wherein the mathematical model is a table containing oscillation frequencies of the oscillation device and related time intervals corresponding to the oscillation frequencies.

9. A method for determining a desired operating condition of an optical scanning oscillation device, the method comprising:
   (a) providing a mathematical formula that relates a time interval to an oscillation frequency of the oscillation device;
   (b) using the mathematical formula to calculate a look-up table of time intervals for different oscillation frequencies of the oscillation device;
   (c) establishing a drive frequency for a specific oscillator; and
   (d) using the drive frequency for the specific oscillator and the lookup table of time intervals to determine a target time interval for the specific oscillator.

10. The method of claim 9 wherein step (a) comprises providing a sinusoidal mathematical formula that relates a time interval to an oscillation frequency of the oscillation device.

11. The method of claim 9 wherein the oscillation device has a clock frequency and step (d) comprises using the drive frequency of the specific oscillator and the look-up table of time intervals and the oscillation device clock frequency to calculate an array of timer counts corresponding to the look-up table of time intervals for the oscillation device.

12. The method of claim 11 further comprising:
   (e) using the resonant frequency of the specific oscillator and the array of timer counts to determine by interpolation a target timer count for the specific oscillator.

13. The method of claim 9 wherein the time interval in the mathematical model that relates to an oscillation frequency of the oscillation device is a function of a constant maximum optical scan angle of the oscillation device.

14. The method of claim 9 wherein the time interval in the mathematical model that relates to an oscillation frequency of the oscillation device is a function of a first sensor optical scan angle and a second sensor optical scan angle.

15. A method for controlling a light beam, the method comprising:
   (a) reflecting the light beam off an oscillation device whereby the light beam is directed in a scanning motion to an imaging surface;
   (b) detecting the light beam with at least two sensors positioned to detect the light beam at specific positions in the scanning motion;
   (c) providing a mathematical model that relates a time interval to an oscillation frequency of the oscillation device, the time interval corresponding to a specific time interval for the oscillation device to scan the light beam between two of the at least two sensors;
   (c) establishing a drive frequency for a specific oscillator; and
   (d) using the mathematical model and the drive frequency of the specific oscillator to calculate a target time interval for the specific oscillator, the target time interval corresponding to a desired time interval for the specific oscillation device to scan the light beam from one of the two sensors to the other of the two sensors.

16. The method of claim 15 further comprising (e) modulating the light beam in a time-domain pattern adjusted to the target time interval.

17. The method of claim 15 further comprising:
   (e) driving the specific oscillator with a drive signal to operate at about the determined drive frequency and measuring an actual time interval for the specific oscillator to scan the light beam between the sensors;
   (f) using the difference between the actual time interval and the target time interval as feedback to correct the drive signal for the specific oscillator.

18. The method of claim 15 where in step (a) the light beam is directed to an imaging surface in a scan having a sinusoidal oscillation cycle.

19. The method of claim 15 wherein the time interval in the mathematical model that relates to the resonant frequency of the oscillation device is a function of a constant maximum optical scan angle of the oscillation device.

20. The method of claim 15 wherein the drive frequency is substantially equal to the resonant frequency of the specific oscillator.

* * * * *